(12) United States Patent
Uchishiba et al.

(10) Patent No.: US 7,765,545 B2
(45) Date of Patent: Jul. 27, 2010

(54) METHOD FOR AUTOMATICALLY IMPARTING RESERVE RESOURCE TO LOGICAL PARTITION AND LOGICAL PARTITIONED COMPUTER SYSTEM

(75) Inventors: Michihiro Uchishiba, Yokohama (JP); Toru Horie, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1328 days.

(21) Appl. No.: 11/221,814

(22) Filed: Sep. 9, 2005

(65) Prior Publication Data
US 2006/0005198 A1    Jan. 5, 2006

Related U.S. Application Data

(63) Continuation of application No. 09/911,385, filed on Jul. 25, 2001, now abandoned.

(30) Foreign Application Priority Data

Jul. 28, 2000    (JP)    ............... 2000-228302

(51) Int. Cl.
  *G06F 9/46*    (2006.01)
  *G06F 9/455*    (2006.01)
(52) U.S. Cl. ................... 718/1; 718/104
(58) Field of Classification Search ............. 718/1, 718/104
  See application file for complete search history.

(56) References Cited

U.S. PATENT DOCUMENTS 4,843,541 A    6/1989    Bean et al.
5,893,157 A    4/1999    Greenspan et al.
5,951,633 A *  9/1999    Polcyn .................. 718/104
6,378,021 B1   4/2002    Okazawa et al.
6,408,393 B1 * 6/2002    Imada et al. ............ 713/300
6,587,938 B1   7/2003    Eilert et al.
7,275,246 B1 * 9/2007    Yates et al. ............. 718/100
2003/0065835 A1 4/2003   Maergner et al.

FOREIGN PATENT DOCUMENTS

| JP | 64-002145 | 1/1989 |
| JP | 1-316833 | 12/1989 |
| JP | 4-47357 | 2/1992 |
| JP | 4314147 | 11/1992 |
| JP | A 6-110715 | 4/1994 |
| JP | 10-293695 | 11/1998 |

* cited by examiner

*Primary Examiner*—Meng-Ai An
*Assistant Examiner*—Kenneth Tang
(74) *Attorney, Agent, or Firm*—Brundidge & Stanger, P.C.

(57) ABSTRACT

A logical partitioned computer system. A hypervisor includes a resource management table for managing resources assigned to the hypervisor and an assigning/collecting unit for assigning and collecting resources to logical partitions. Each logical partiion has a guest resource monitoring unit for monitoring the amount of the resource being used out of the amount of the resource assigned to the logical partiion and an adding/separating unit for requesting addition and separation of a resource to the assigning/collecting unit based on results of monitoring. In response to the request, assigning/collecting unit searches resource management table, assigns a resource to logical partition when a reserve resource exists in case of an assignment request, and collects a resource as a reserve resource in the resource management table in case of a collection request.

3 Claims, 8 Drawing Sheets

FIG.13

METHOD FOR AUTOMATICALLY IMPARTING RESERVE RESOURCE TO LOGICAL PARTITION AND LOGICAL PARTITIONED COMPUTER SYSTEM

This application is a continuation of U.S. patent application Ser. No. 09/911,385, filed Jul. 25, 2001, now abandoned which is incorporated by reference herein in its entirety.

BACKGROUND OF THE INVENTION

1. Field of the Invention

The present invention relates to a logical partitioned computer system, and more particularly to a logical partitioned computer system in which a plurality of logical partitions are provided by a control program called a hypervisor so as to operate an operating system (guest OS) in the respective logical partitions.

2. Description of the Related Art

As a technique for operating a plurality of operating systems (guest OS's) in one physical computer, a logical partitioned computer system is known for effecting control by preparing logical partitions. The logical partitioned computer system is configured by a control program called a hypervisor for controlling the logical partitions. The hypervisor is a control program which constitutes a nucleus for controlling the logical partitions, and effects control of the assignment of resources (computer resources) including an instruction processor, a main storage device, and an input/output (I/O) channel, and the like. The hypervisor is a control program for logically partitioning the physical resources and constituting walls among the logical partitions, and the main role of the hypervisor is to set "walls" for the hardware.

In the logical partitioned computer system, the amount of resources necessary at the time of operation of the guest OS's is estimated, the configurations of the logical partitions are defined in accordance with the estimation, and the resources are assigned in accordance with the defined configurations when the logical partitions are generated.

In a case where the resources required for the respective logical partitions are different between the daytime and nighttime, an implementation is carried out in which the assignment of the resources among the logical partitions is systematically changed in accordance with an operator's operation schedule or an automatic operation schedule.

As for a method of this implementation, a detailed description is given in JP-A-6-110715. Although JP-A-6-110715 is premised on a virtual computer system, the virtual computer system has a function similar to that of logical partitioning, and the method of partitioning resources is also generally similar.

In addition, a charging system based on a volume sensitive rate has appeared as a recent charging system of computers. This is a system in which numerous resources are mounted in advance, and the charge of renting a computer is determined depending on the amount of resources used. Since the resources are necessary in proportion to the incurred load, one must pay a charge for the amount by which the computer was used.

SUMMARY OF THE INVENTION

With a conventional computer system, it is necessary to prepare in advance sufficient resources capable of withstanding the load. If sufficient resources cannot be assigned, and a load more than is allowable is applied to the computer system, a serious problem can occur in that, for example, processing by a guest OS becomes extremely slow.

As one phenomenon that this processing becomes extremely slow, a phenomenon which is generally called slowdown is known. For example, thrashing is known as a slowdown phenomenon which occurs due to the shortage of main memory. In thrashing, if a real storage device is in short supply in a virtual storage system, paging occurs frequently. If this situation becomes exacerbated, a major portion of the processing time is spent by a control program for the purpose of page in and page out processing, and user programs practically fail to operate.

On the other hand, if excess resources are imparted, the resources are not fully utilized and are wasted. For example, in a system in which a high load can occur suddenly due to the concentration of accesses as in the case of a WWW server, a large volume of resources is required in preparation for the high load. Meanwhile, excessively large resources are not fully utilized during low loads and are wasted, so that a problem occurs in that the cost performance is low.

In the computer system using the above-described charging system based on the volume sensitive rate, since charges corresponding to the amount of resources used have to be paid, it can be said that the cost performance is good for the users; however, the installation of excessively large resources constitutes a burden for the vendor. In addition, since the charging system is based on the volume sensitive rate, there is another aspect that the rental charges for renting the computer vary.

Accordingly, it is an object of the present invention to provide a logical partitioned computer system which permits additional assignment of resources necessary at the time of implementation of a computer system, reduces wasteful resources, and can be operated stably at a low cost, thereby overcoming the above-described drawbacks of the conventional art of the computer system.

To attain the above object, in accordance with the present invention, there is provided a method for automatically imparting a reserve resource to a logical partition in a logical partitioned computer system in which one or more logical partitions are provided in one physical computer, and an operating systems is operated in each of the logical partitions, comprising the steps of: monitoring an amount of the resource being used in an amount of the resource being assigned to each of the logical partitions, requesting assignment of the resource to the physical computer if the resource is being used more than a predetermined threshold as a result of monitoring, and requesting collection of the resource to the physical computer if a surplus more than a predetermined threshold is present in the overall resource; and causing the physical computer upon receipt of the request to assign the reserve resource to the logical partition in the case of the assignment request, and to set the resource being assigned to the logical partition as the reserve resource in the case of the collection request.

In addition, as the logical partitioned computer system, the physical computer is provided with a resource managing unit for managing the resource being assigned to the physical computer and an assigning/collecting unit provided in the physical computer for effecting the assignment or collection of the resource with respect to each of the logical partitions, while each of the logical partitions is provided with a monitoring unit for monitoring an amount of the resource being used out of an amount of the resource assigned and an adding/separating unit for requesting the assigning/collecting unit to add or separate the resource on the basis of a result of monitoring by the monitoring unit, wherein the assigning/collecting unit inquires the resource managing unit in compliance with a request from the adding/separating unit, and assigns the resource to the logical partition when a reserve resource is present in the case of an assignment request, and collects the resource as the reserve resource in the resource managing unit in the case of a collection request.

In addition, the logical partitioned computer system further comprises: an external resource adding/separating unit provided in the physical computer, wherein the external resource adding/separating unit adds or separates the external resource with respect to the resource managing unit in response to an instruction for the addition or separation of the resource by an operator.

In addition, the logical partitioned computer system further comprises: a management table provided for each of the logical partitions in the physical computer, wherein information on assignability of the reserve resource is set in the management table, and when a resource assignment request has been received from the adding/separating unit of the logical partition, the contents of the information on assignability of the reserve resource in the logical partition management table are examined. If the contents indicate positive resource assignability, the assignment of the reserve resource is effected, whereas if the contents indicate negative resource assignability, the assignment of the reserve resource is not effected.

Further, in the logical partitioned computer system, the resource managing unit sets the logical partition to which the reserve resource is assigned for each reserve resource, and upon receipt of the assignment request from the adding/separating unit in the logical partition, the resource managing unit assigns an assignable reserve resource to the logical partition.

The above and other objects, features and advantages of the present invention will become more apparent from the following detailed description of the invention when read in conjunction with the accompanying drawings.

DESCRIPTION OF THE EMBODIMENTS

Referring now to the accompanying drawings, description will be given of an embodiment of the logical partitioned computer system in accordance with the invention.

Figure 1:
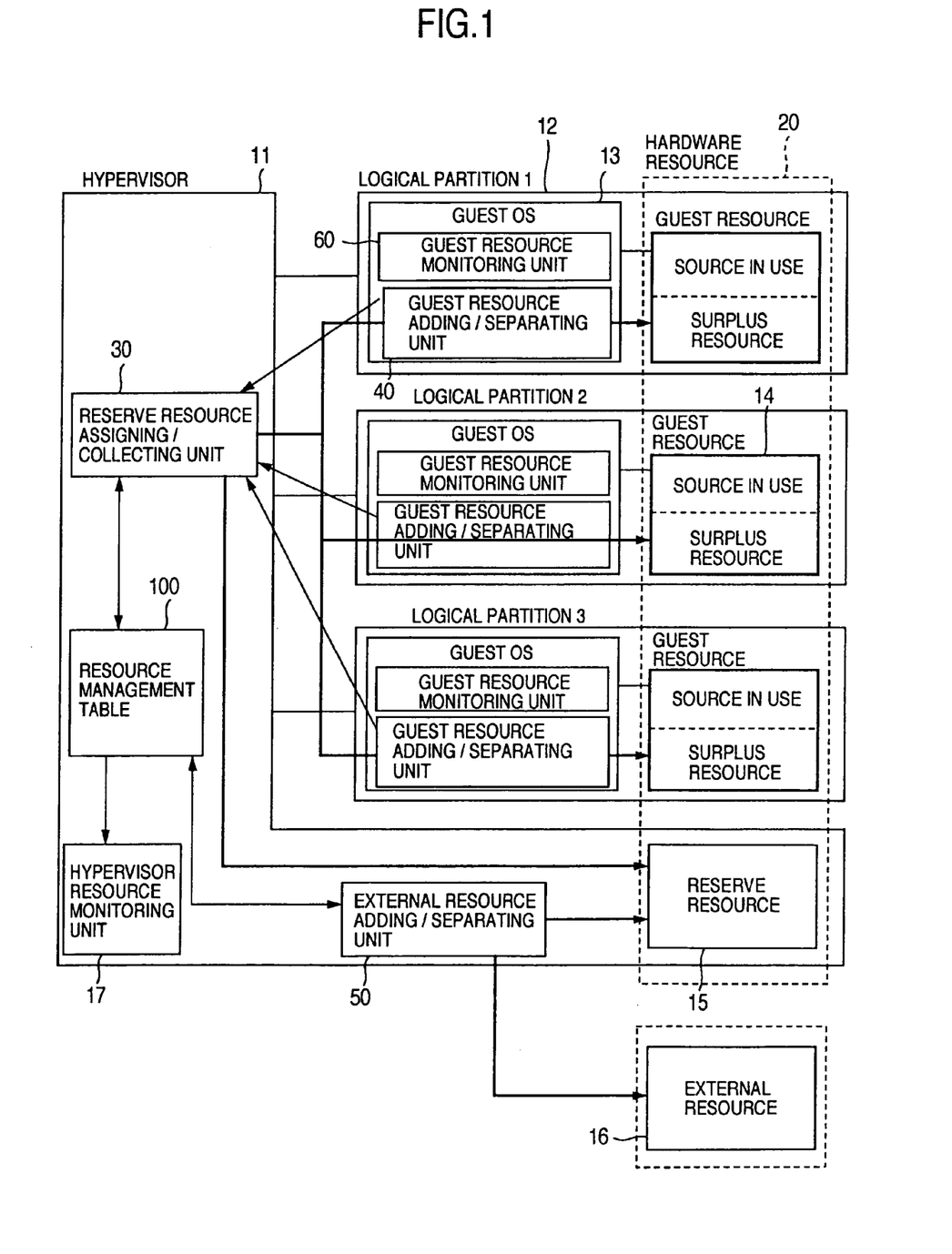
FIG. 1 is a block diagram illustrating the configuration of the logical partitioned computer system in accordance with an embodiment of the invention.

FIG. 1 is a block diagram illustrating a configuration of a logical partitioned computer system in accordance with an embodiment of the invention. First, referring to FIG. 1, a description will be given of a system for automatically imparting a reserve resource to a logical partition in accordance with the invention.

In FIG. 1, reference numeral 11 denotes a hypervisor; 12, a logical partition; 13, an operating system (guest OS); 30, a reserve resource assigning/collecting unit; 60, a guest resource monitoring unit for monitoring the amount of resources used by the guest OS; 40, a guest resource adding/separating unit; 50, an external resource adding/separating unit; 100, a resource management table; 20, a hardware resource; 14, a guest resource; 15, a reserve resource; 16, an external resource unrecognized by the hypervisor and the guest OS; and 17, a hypervisor resource monitoring unit for monitoring the resource management table of the hypervisor.

The logical partitioned computer system is configured by dividing an instruction processor 201, a main storage device 202, an input/output (I/O) channel 203, and the like which are the resources of a physical computer so as to generate a plurality of logical partitions 12.

Each of the logical partitions 12 is capable of operating the guest OS 13. If seen from the guest OS, the logical partition appears to be just like an independent computer.

The basic structure of the logical partitioned computer system is well known and is also described in U.S. Pat. No. 4,843,541.

Figure 2:
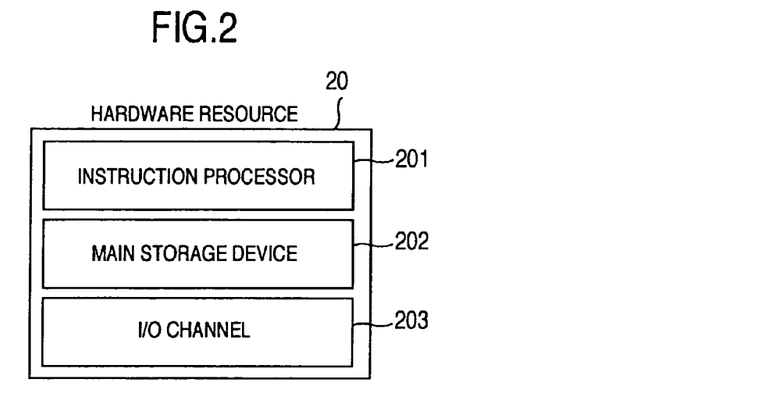
FIG. 2 is a diagram illustrating the configuration of hardware resources.

FIG. 2 is a diagram illustrating the configuration of resources.

As described above, the computer system has an instruction processor, a main storage device, and an I/O channel, and the hypervisor controls the assignment of these resources to the logical partitions.

The guest resources 14, the reserve resource 15, and the external resource 16 shown in FIG. 1 indicate portions or all of the three kinds of resources shown in FIG. 2.

The logical partitioned computer system is operated by estimating loads applied to the logical partitions and by determining the amounts of resources assigned to the logical partitions during the designing of the system.

Figure 3:
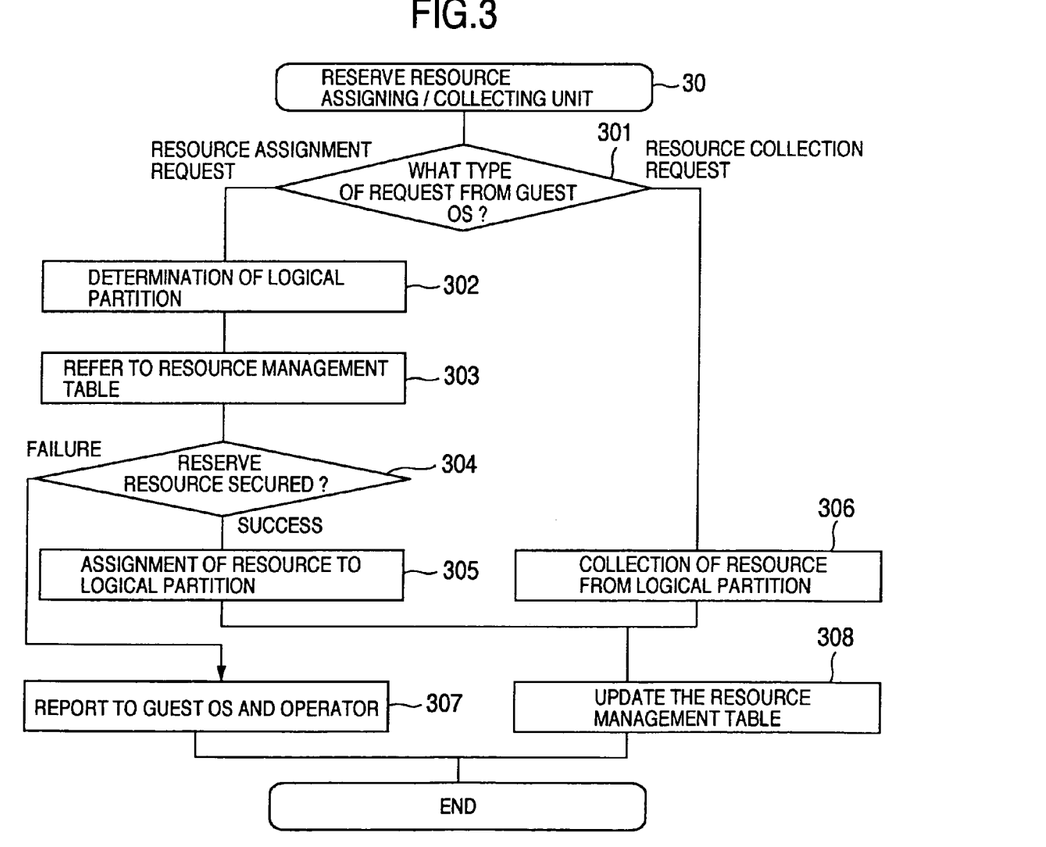
FIG. 3 is a flowchart explaining processing by a reserve resource assigning/collecting unit of a hypervisor.
Figure 4:
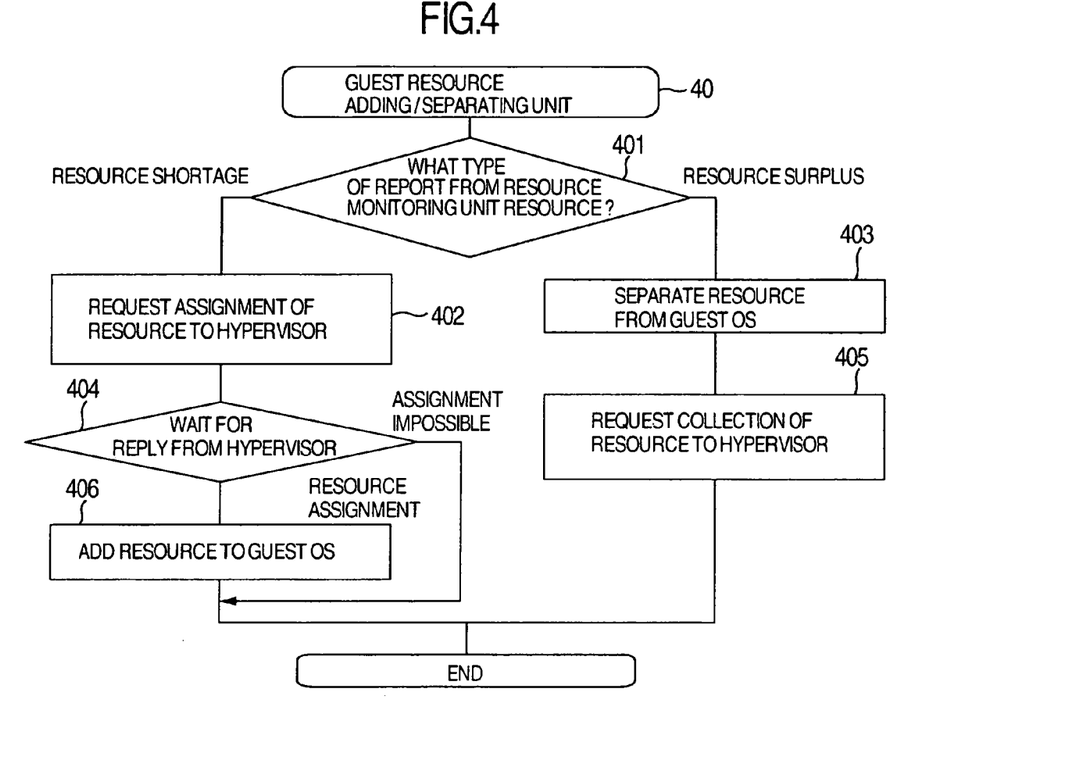
FIG. 4 is a flowchart explaining processing by a guest resource adding/separating unit of a guest OS.
Figure 6:
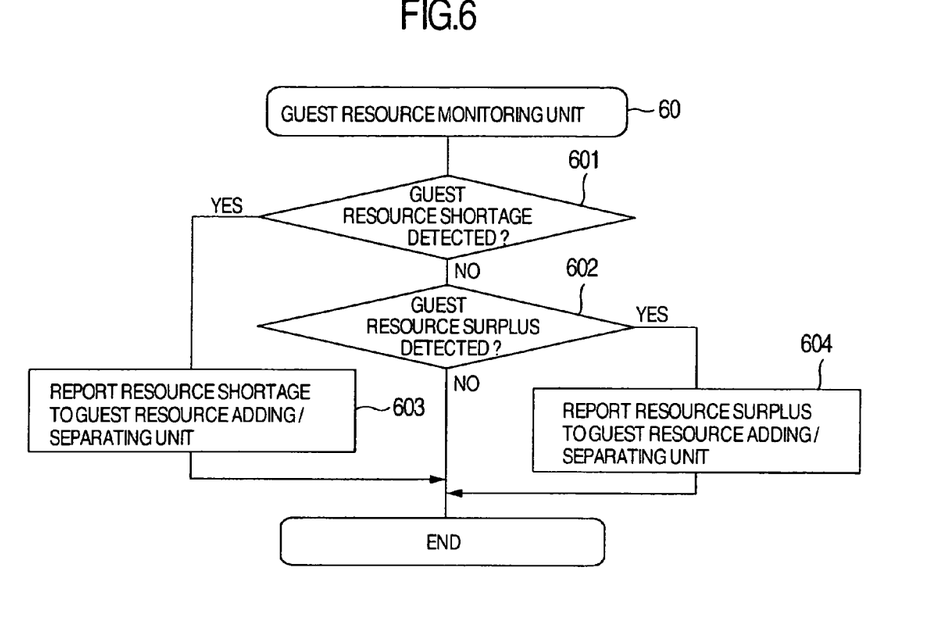
FIG. 6 is a flowchart explaining processing by a guest resource monitoring unit of the guest OS.

FIG. 3 is a flowchart explaining processing by the reserve resource assigning/collecting unit of the hypervisor. FIG. 4 is a flowchart explaining processing by the guest resource adding/separating unit of the guest OS. FIG. 6 is a flowchart explaining processing by the guest resource monitoring unit of the guest OS.

Referring now to these drawings, a description will be given of assigning the reserve resource to the guest OS's.

The guest resource monitoring unit 60 of the guest OS monitors the resource used by the guest OS at fixed time intervals. As a result of performing monitoring a certain number of times when the surplus resource of the guest resource has decreased due to the occurrence of a high load or the like, the guest resource monitoring unit 60 detects that the guest OS is in a state of resource shortage or in a critical state leading to the resource shortage in a case where the surplus resource is below a certain threshold or in a case where an index representing a characteristic of the decrease is below a certain threshold (Step 601).

For example, the guest resource monitoring unit 60 reports a resource shortage to the guest resource adding/separating unit 40 to the effect that a state of resource shortage has been detected in the following cases (Step 603):

In the case of the instruction processor: when the rate of use of the instruction processor is 99% or more and when the response time of the online transaction is not less than two times the normal for the duration of a certain number of times of monitoring;

In the case of the main storage device: when the capacity shortage of the virtual storage device has been detected, and the thrashing state of the OS has been detected since a space area is not produced due to the consecutive occurrence of accesses to the virtual storage despite a plurality of times of page out instructions issued by an operation monitoring program in the OS to a memory control program in the OS to secure a space area; and In the case of the I/O channel: when the channel busy rate is 80% or more for the duration of a certain number of times of monitoring.

It should be noted that the threshold for determining the resource shortage is to be given by parameters, commands, or the like for the respective guest OS's in accordance with the contents of activities and the operating state of the system, and the resetting of the threshold by the user during the operation may be allowed.

Upon receipt of the notification of the resource shortage from the guest resource monitoring unit 60 (Step 401), the guest resource adding/separating unit 40 determines the amount of resources required on the basis of the state of the guest OS, and reports the kind and amount of resource to the reserve resource assigning/collecting unit 30 of the hypervisor as a resource assignment request (Step 402). For example, in the case of the main storage device, a report is given as "main storage device 16 MB."

Next, upon receipt of the resource assignment request from the guest resource adding/separating unit 40, the reserve resource assigning/collecting unit 30 determines the type of request from the guest OS (Step 301), and executes Step 302 and thereafter in the case of the resource assignment request.

In Step 303, the resource management table 100 is referred to, and the requested reserve resource is secured (Step 304). (The determination of the logical partition in Step 302 will be described later.)

Figure 10:
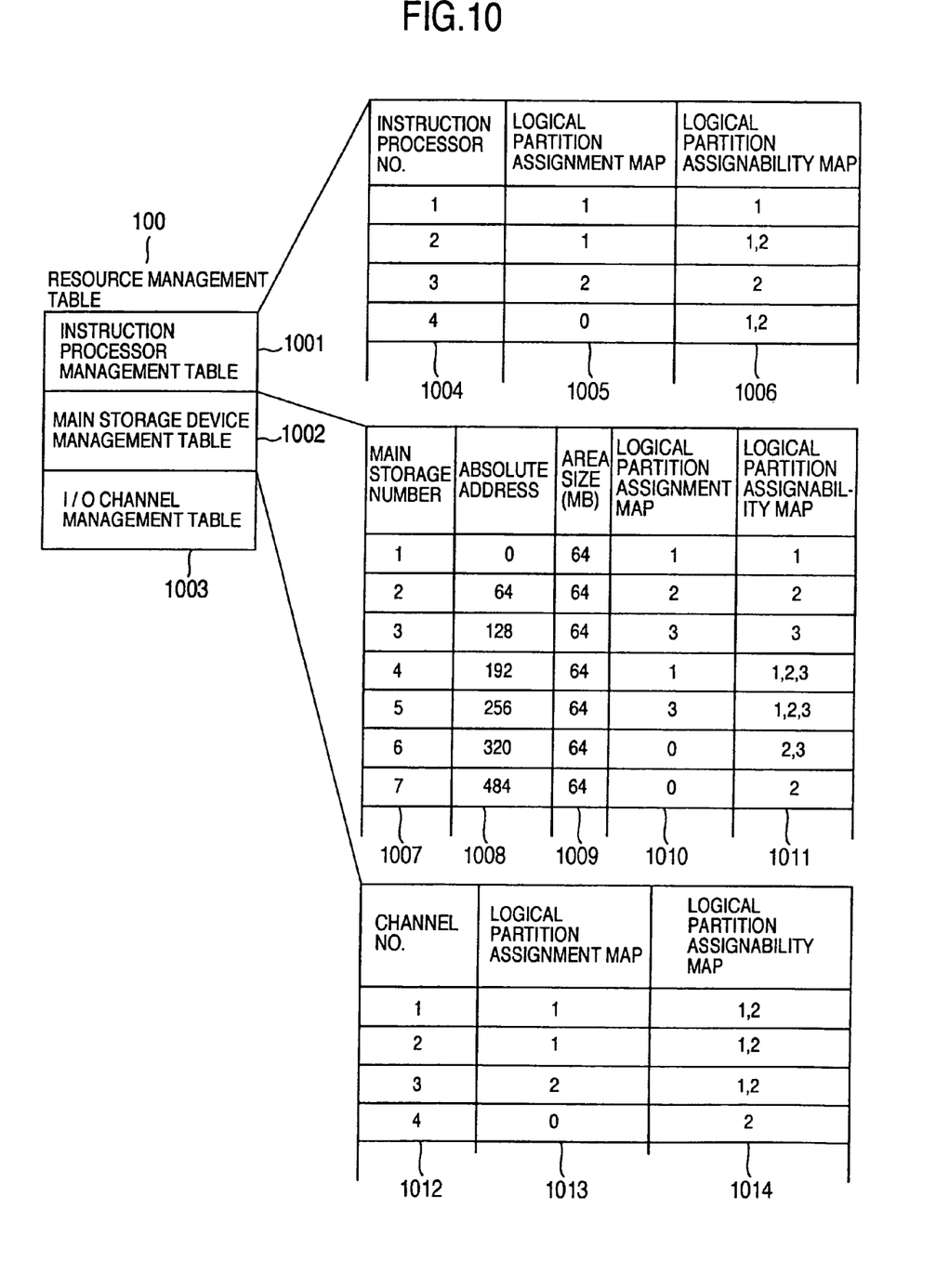
FIG. 10 is a diagram illustrating a resource management table.

The details of the resource management table 100 of the hypervisor are shown in FIG. 10.

To secure the reserve resource, it suffices if reference is made to a logical partition assignment map 1005 in which logical partition numbers of the logical partitions being currently assigned are set.

It is assumed that the logical partition numbers are provided in an ascending order starting with 1, and that 0 is set in a case where the resource has not been assigned to the logical partition. Accordingly, if a resource for which the logical partition number in the logical partition assignment map is 0 is searched from the resource management table, it is possible to find an assignable reserve resource.

If the assignable reserve resource is not sufficient, a report is made to the guest OS and the operator who operates the computer (Step 307).

On the other hand, if the hypervisor holds a reserve resource sufficient for the assignment, a report is made on the type and amount of resource to be assigned to the logical partition for which the assignment request has been reported (Step 305), and the logical partition number of the logical partition for which the assignment has been made is registered in the logical partition assignment map (1005, 1010, or 1013) in the resource management table (Step 308).

Upon receipt of the notification of the resource assignment from the hypervisor (Step 401), the guest resource adding/separating unit 40 changes the information (tables and the like for managing the resource) in the guest OS to make it possible for the guest OS to use the resource (Step 406).

Through the foregoing processing, the reserve resource of the hypervisor can be assigned to the logical partition, thereby making it possible for the guest OS to use the assigned resource.

Next, a detailed description will be given of the procedure of assignment to the logical partitions by type of resource.

Figure 7:
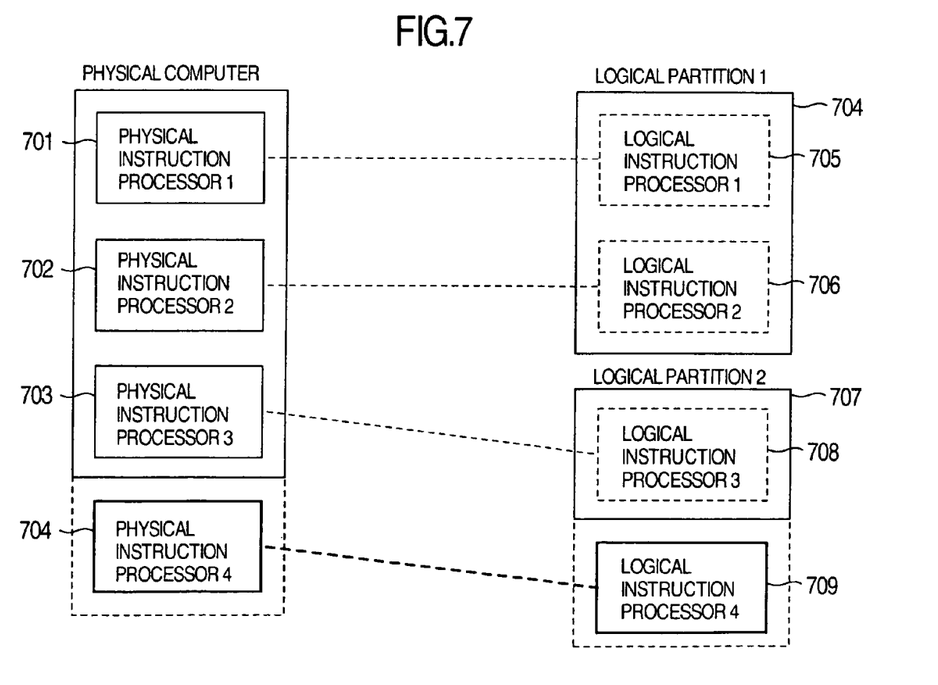
FIG. 7 is a diagram illustrating an example in which instruction processors of the reserve resource are added to guests.

FIG. 7 shows an example of the state of assignment of instruction processors.

Physical instruction processors 1, 2-(701, 702) are assigned to logical instruction processors 1, 2 (705, 706) of a logical partition 1 (704), while a physical instruction processors 3 (703) is assigned to a logical instruction processor 3 (708) of a logical partition 2 (707).

Here, if a shortage of the instruction processor occurs in the logical partition 2, a physical instruction processor 4 (704) of the reserve resource is assigned as a logical command processor 4 (709) in the logical partition 2.

In this case, the instruction processor number 4 in the logical partition assignment map of the resource management table is changed from 0 to 2.

Figure 8:
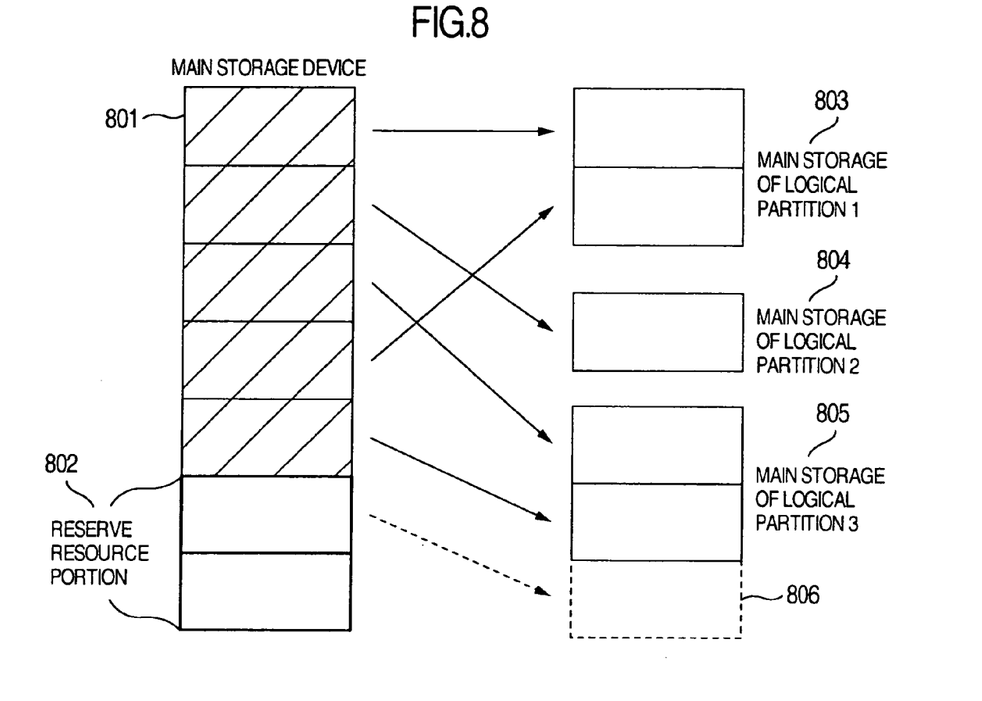
FIG. 8 is a diagram illustrating an example in which a main storage device of the reserve resource is added to the guests.

FIG. 8 shows an example of the state of assignment of the main storage device.

The main storage device (801) is assigned to the logical partitions 1, 2, and 3 (803, 804, and 805), and if the shortage of the main storage device occurs in the logical partition 3, the reserve resource (802) of the main storage device is assigned to the main storage space (806) in the logical partition 3.

In this case, in the resource management table, the main storage number 6 in the logical partition assignment map is changed from 0 to 3.

Figure 9:
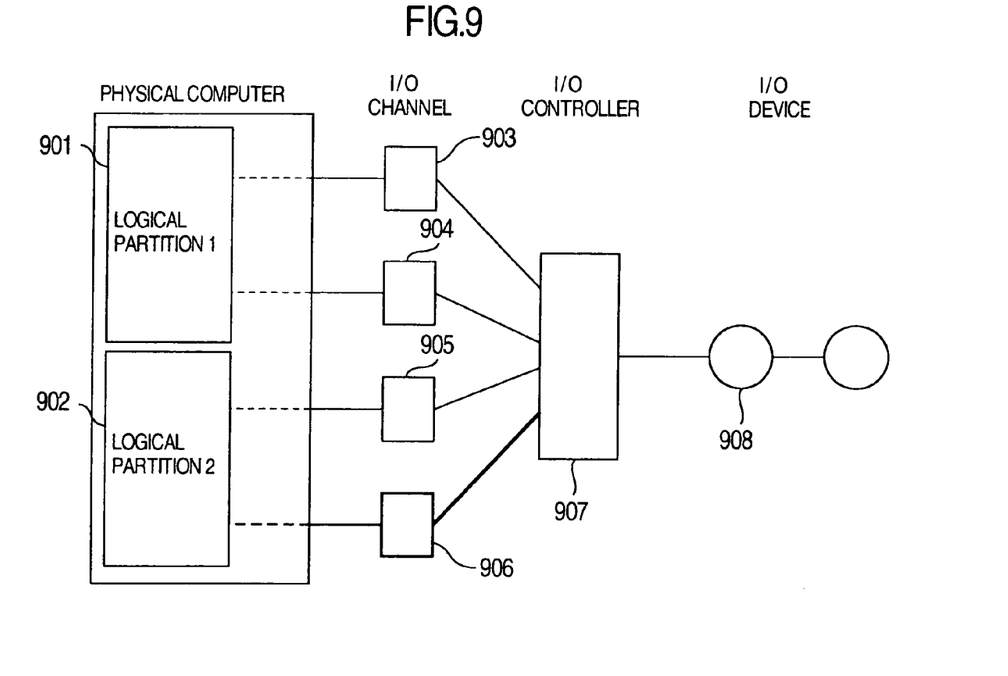
FIG. 9 is a diagram illustrating an example in which I/O channels of the reserve resource are added to the guests.

FIG. 9 shows an example of the state of assignment of the I/O channels.

I/O channels 903 and 904 are assigned to the logical partition 1 (901), while an I/O channel 905 is assigned to the logical partition 2 (902), and accesses to an I/O device 908 are effected through an I/O device 907.

In case where a shortage of the I/O channel has occurred in the logical partition 2, an I/O channel (906) is assigned to the logical partition 2.

In this case, in the resource management table, the channel number in the logical partition assignment map is changed from 0 to 2.

Next, a description will be given of an example of a method of collecting the resource from the logical partition.

After the assignment of the reserve resource to the logical partition due to a high load, when the load on the logical partition has decreased and surplus has occurred in the resource, and if, for instance, there has been a surplus of 30% or more with respect to the entire resource being assigned to the logical partition in the result of each of a plurality of times of monitoring, the guest resource monitoring unit 60 assumes that a surplus of the resource has been detected (Step 602), and reports the resource surplus to the guest resource adding/separating unit 40 (Step 604).

Upon receipt of the report on the resource surplus (Step 401), the guest resource adding/separating unit 40 deletes the resource information from the internal table of the guest OS (Step 403), and makes a resource collection request to the hypervisor (Step 405).

Next, upon receipt of the resource collection request, the reserve resource assigning/collecting unit 30 of the hypervisor determines the type of request from the guest OS (Step 301), and executes Step 306 and thereafter in the case of the resource collection request. In Step 306, the resource is collected from the logical partition, and the logical partition assignment map (1005, 1010, or 1013) in the relevant entry of the resource management table is changed to 0 (Step 308), and is held as the reserve resource of the hypervisor.

As described above, even if the resource of the logical partition has become short, the addition of the resource is effected instantly, thereby making it possible to avoid a serious problem such as the slowdown of the guest OS.

In addition, when the resource which was once imparted to the logical partition becomes unnecessary, the resource is collected by the hypervisor as the reserve resource, and is held by the hypervisor until it is assigned to the logical partition in which the resource shortage occurred.

Next, a description will be given of the addition and separation of the external resource.

In a case where requests for assignment of the reserve resource are made from a multiplicity of logical partitions, a case is conceivable in which the hypervisor becomes unable to secure the requested reserve resource.

To cope with such a situation in advance, the hypervisor resource monitoring unit 17 for monitoring the reserve resource held by the hypervisor is provided to report the operator by such as outputting a message in a case where the remaining amount of the reserve resource has dropped below a certain threshold.

Consequently, it becomes possible to provide measures such as the additional purchase, additional installation, and the like of the resources for the computer. This resource added to the physical computer will be referred to as an external resource, and a description will be given hereafter of the addition and separation of the external resource.

Figure 5:
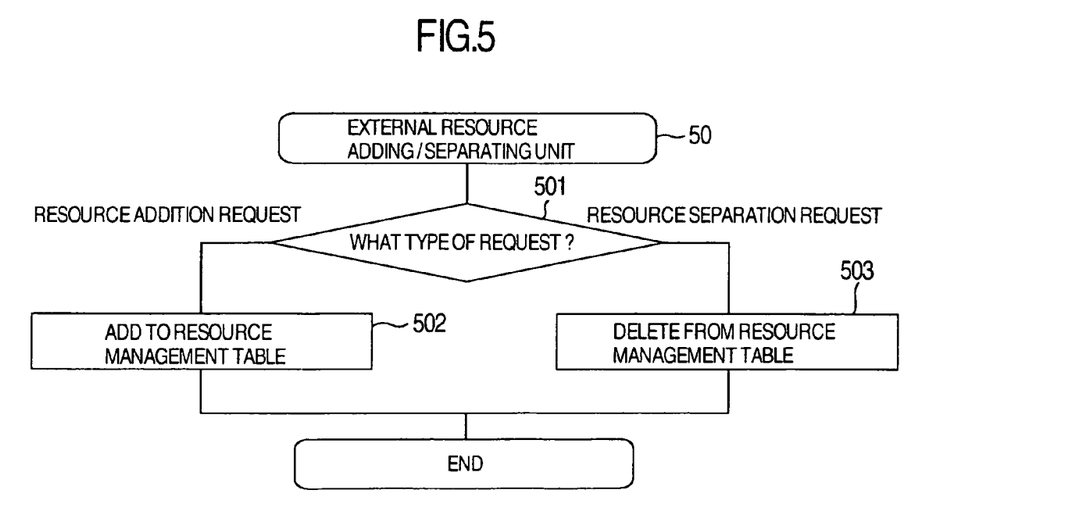
FIG. 5 is a flowchart explaining processing by an external resource adding/separating unit of the hypervisor.

A customer engineer or maintenance person effects the additional installation of the resource in the physical computer and sets the computer in a physically usable state. Next, as the operator inputs a command, a resource addition request is sent to the external resource adding/separating unit 50. Upon receipt of the resource addition request (Step 501), the external resource adding/separating unit 50 adds the external resource additionally installed in the resource management table 100 as a reserve resource (Step 502), thereby making it possible for the hypervisor to manage the additionally installed resource.

Thus, even in a case where the reserve resource of the hypervisor has become short, the addition of the reserve resource is effected during operation without stopping the system.

Meanwhile, in a case where the external resource is separated, when a resource separation request is similarly sent to the external resource adding/separating unit 50 by such as the input of a command by the operator (Step 501), the external resource adding/separating unit 50 deletes the information of the resource for which the request has been made, so as to separate the resource from the reserve resource as the external resource which can be removed from the physical computer.

Finally, the customer engineer removes from the computer the resource which has been set as the external resource.

Next, in order to avoid a problem that in the event that the reserve resource has been used up in a certain logical partition, the reserve resource becomes unusable in a logical partition having a high priority in such as the actual online activities, a description will be given below of two examples in which the reserve resource is used flexibly.

One method is that which makes it possible to select whether or not the assignment of the reserve resource is to be accepted in a certain logical partition.

Through the operation at the time of initialization or during operation, whether or not the reserve resource can be assigned is selected for each logical partition.

This assignability is used at the time of making a determination as to whether or not the assignment is possible with respect to a logical partition when a resource assignment request has been made from the guest OS.

This determination corresponds to Step 302 in FIG. 3.

Furthermore, a region (1105) for storing the information on the assignability of the reserve resource is provided in a logical partition management table 1101 (shown in FIG. 11) for storing the constituent information for each logical partition, and this information on the assignability is held therein.

Figure 11:
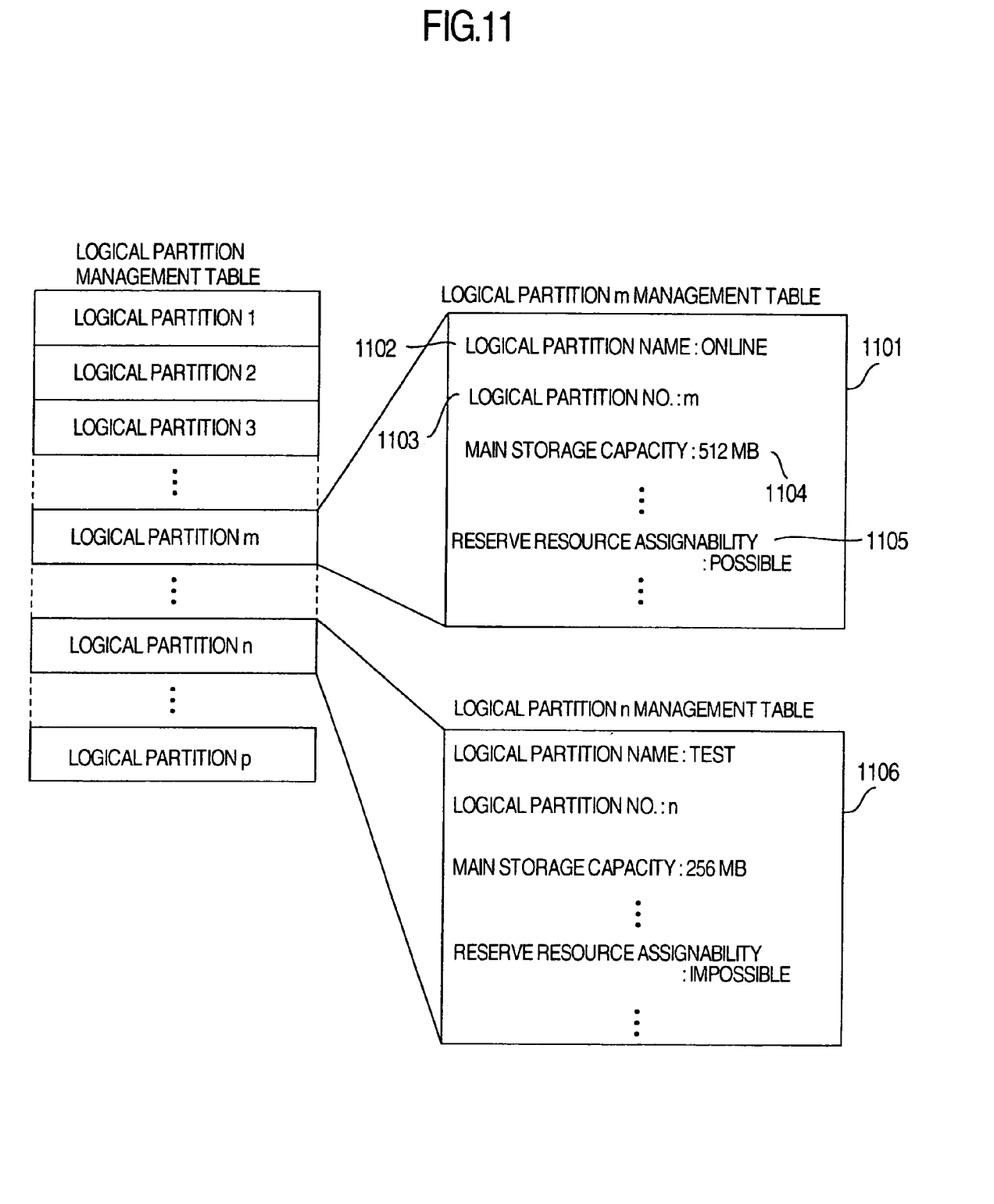
FIG. 11 is a diagram illustrating a logical partition management table.

It should be noted that the logical partition management table is for allowing the hypervisor to store the information for managing the configuration of each logical partition such as a logical partition name 1102, a logical partition number 1103, a main storage capacity 1104, and the like, and is essential to the configuration of the logical partitioned computer system.

Figure 13:
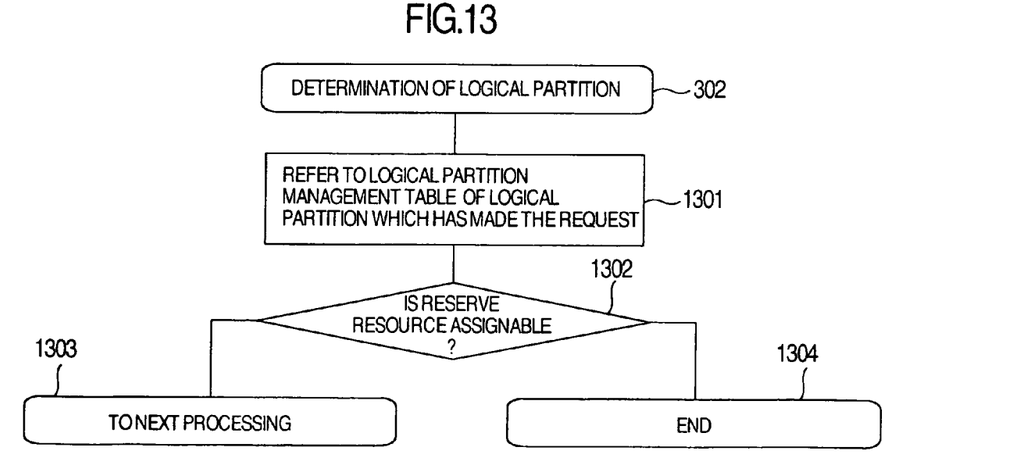
FIG. 13 is a flowchart explaining processing for determination of a logical partition in the reserve resource assigning/collecting unit of the hypervisor.

As for the details of the determination of assignability with respect to the logical partition (Step 302), as shown in FIG. 13, in a case where a resource assignment request has been made from the guest OS (Step 301), the logical partition management table of the logical partition which has made the request is referred to (Step 1301), and if the value of the assignability of the reserve resource is YES, the operation proceeds to the ensuing processing (Step 303). On the other hand, if the value is NO, the operation ends without doing anything for the resource assignment request from the guest OS (Step 1304).

The second method is one in which the reserve resource is partitioned, and the assignable logical partitions are set for the respective partitions.

As shown in FIG. 10, logical partition assignability maps 1006, 1011, and 1014 are set for the respective reserve resource partitions, and the assignment of the partitioned resources is made possible only for the logical partitions where the logical partition numbers are present in the map.

These logical partition assignability maps are referred to by the reserve resource assigning/collecting unit 30 when the necessary reserve resource is secured, as required, in response to the assignment request (Step 304).

Figure 12:
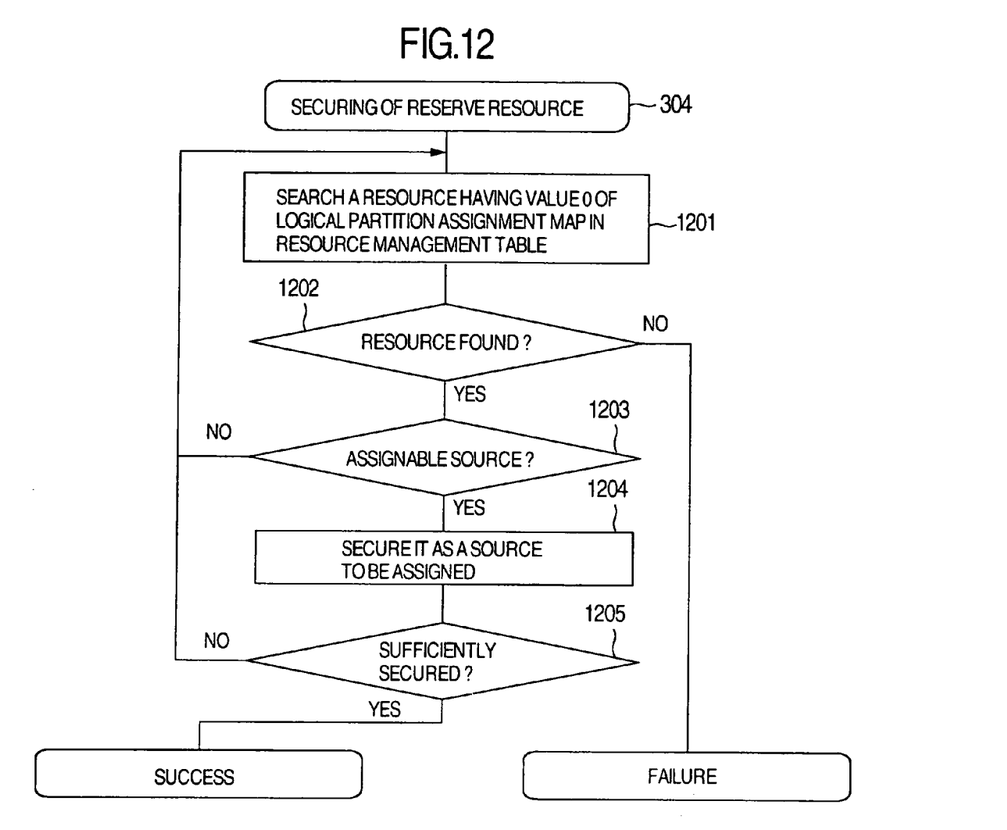
FIG. 12 is a flowchart explaining processing for securing the reserve resource in the reserve resource assigning/collecting unit of the hypervisor.

As shown in FIG. 12, the securing of the reserve resource is accomplished by searching such a resource that the value of the logical partition assignment map (1005, 1010, or 1013) in the resource management table is 0, and the logical partition number of the logical partition for which the assignment request has been made is present as the value of the logical partition assignability map (1006, 1011, or 1014).

For example, in the case of securing the main storage, in FIG. 10, if the logical partition assignment map 1010 is referred to, and the main storage devices capable of being assigned to the logical partition 2 are searched consecutively starting with a leading entry, it is possible to detect the main storage devices with main storage numbers 6 and 7.

In addition, if the main storage devices capable of being assigned to the logical partition 3 are similarly searched, it is possible to detect the main storage device with the main storage number 6.

Further, the main storage devices capable of being assigned to the logical partition 1 are similarly searched, no assignable main storage device is detected.

In this example, since the request for the logical partition 1 is suppressed, and 64 MB can be set as an upper limit for the logical partition 3, control is possible for securing the main storage resource of 64 MB for the logical partition 2.

Through the above-described two methods, flexible usage becomes possible in which a large reserve resource can be secured in advance for an important logical partition.

As described above, in accordance with the invention, by the provision of a guest resource monitoring unit for monitoring the resource shortage occurring in the guest OS and a reserve resource capable of being instantly assigned to any logical partition, it becomes possible to operate a plurality of guest OS's at low cost on a stable basis.

What is claimed is:

1. A logical partitioned computer system in which one or more logical partitions are provided in one physical computer, and an operating system is operated in each of the logical partitions, said logical partitioned computer comprising:
   a resource managing unit provided in said physical computer for managing a resource being assigned to said physical computer;
   an assigning/collecting unit provided in said physical computer for effecting one of requesting an assignment of a part of a reserve resource or a collection of an unused part of a regular resource with respect to each of the logical partitions upon detecting a surplus of the regular resource;
   a monitoring unit provided in each of the logical partitions for monitoring an amount of the regular resource being assigned; and
   an adding/separating unit provided in each of the logical partitions for requesting said assigning/collecting unit to add or separate the resource based on a result of the monitoring by said monitoring unit,
   wherein said assigning/collecting unit inquires said resource managing unit in compliance with a request from said adding/separating unit, and stores the unused part of the regular resource being assigned to the logical partition to the reserve resource in the case of a collection request, and assigns a resource stored in the reserve resource as an additional resource to the logical partition in the case of an assignment request;
   a mangement table provided for each of the logical partitions in said physical computer,
   wherein information on assignability of the reserve resource is set in said management table, and when a resource assignment request has been received from said adding/separating unit of the logical partition, whether or not the assignment of the reserve resource is to be effected is determined in accordance with the contents of the information on assignability of the reserve resource in said logical management table.

2. The logical partitioned computer system according to claim 1, further comprising:
   an external resource adding/separating unit provided in said physical computer,
   wherein said external resource adding/separating unit adds or separates the external resource with respect to said resource managing unit in response to an instruction by an operator.

3. The logical partitioned computer system according to claim 1, wherein said resource managing unit sets the logical partition to which the reserve resource is assigned for each reserve resource, and upon receipt of the assignment request from said adding/separating unit in the logical partition, said resource managing unit assigns an assignable reserve resource to the logical partition.

* * * * *